July 28, 1970  M KENNETH JOHNSON  3,521,667
CONTROL VALVE
Filed Jan. 22, 1968
FIG.1.
FIG.2.
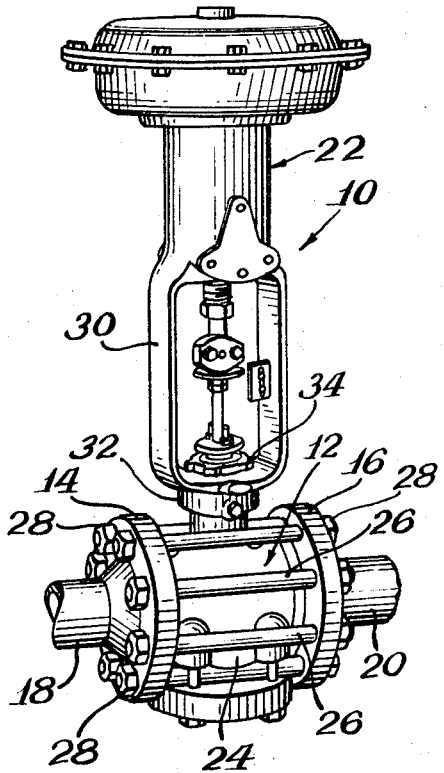
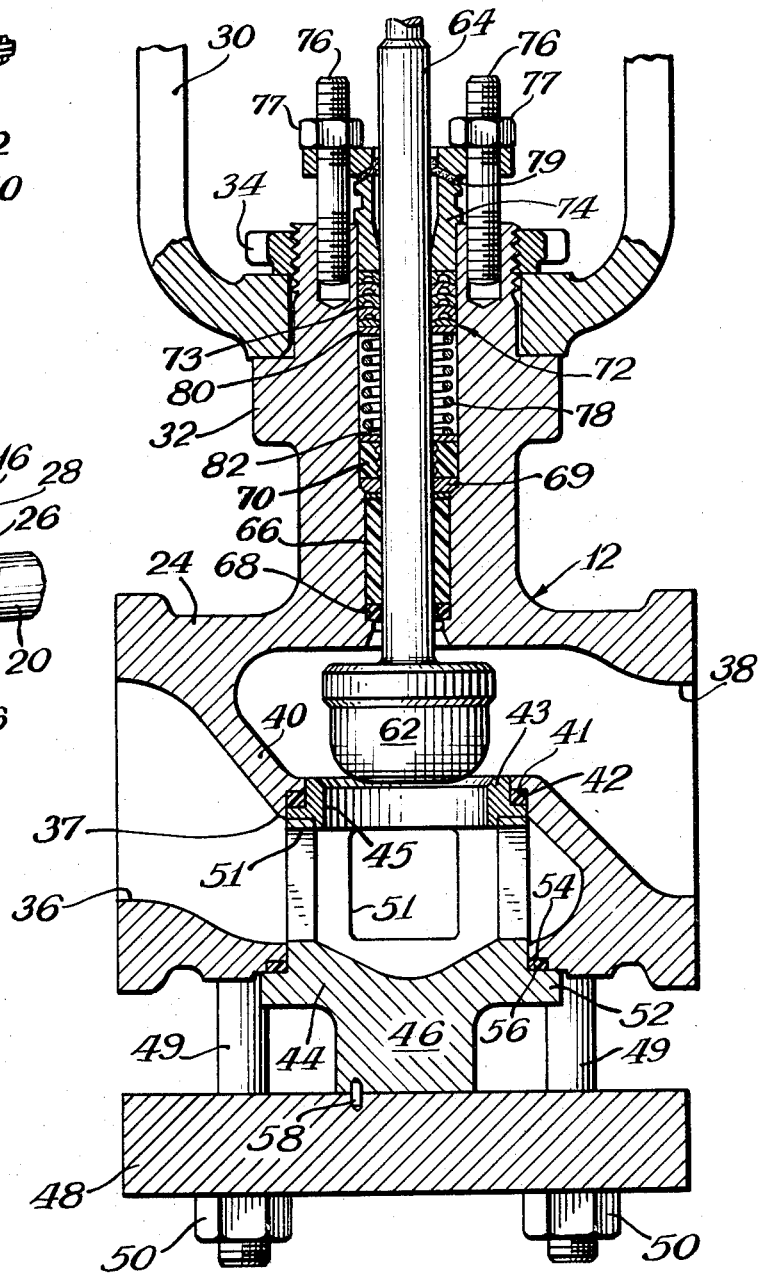
Inventor:
M. Kenneth Johnson
By Bair, Freeman & Molinare
Attys.

United States Patent Office 3,521,667
Patented July 28, 1970

3,521,667
CONTROL VALVE
M Kenneth Johnson, Marshalltown, Iowa, assignor to Fisher Governor Company, a corporation of Iowa
Filed Jan. 22, 1968, Ser. No. 699,635
Int. Cl. F16k 29/00, 43/00
U.S. Cl. 137—454.6      2 Claims

ABSTRACT OF THE DISCLOSURE

A control valve comprising a unitary cast valve body and bonnet. The valve seat and valve cage are detachably secured within the valve body by a means of detachable retaining means. Cooperating shoulders on the valve cage and valve body provide a stop to provide the correct compressive loading on gaskets between the valve cage and valve body and between the valve seat and valve body.

BACKGROUND OF THE INVENTION

This invention relates to a control valve and, more particularly, to a valve adapted for control of corrosive fluids.

Among the criteria for a control valve adapted for handling corrosive fluids is that the valve body be made of a material to combat the corrosion, that the internal parts be easily replaceable so as to reduce down time and cost of periodic maintenance and that there be no screwed end connections, so that the valve body can be readily mounted between pipeline flanges. Some prior art devices have required removal of the valve body from the pipeline in order to effect repair or maintenance of the internal parts. Commonly, flanges have been provided on the valve body, which flanges are adapted to engage and be secured to cooperating flanges on the pipeline.

An object of the present invention is to provide a novel control valve having a flangeless unitary valve body including integral bonnet, which body mounts between pipeline flanges, the construction saving flange material and providing for economical installation in a pipeline.

Another object of the present invention is to provide a novel control valve, wherein the internal parts, including the valve cage, seat ring and valve plug, are easily removed from the valve body without removal of the valve body from the pipeline. Other objects and advantages of the present invention will become more apparent hereinafter.

BRIEF DESCRIPTION OF THE DRAWING

A preferred embodiment of the present invention is illustrated in the attached drawing, wherein:

FIG. 1 is a perspective view illustrating a control valve embodying the principles of the present invention mounted in a pipeline; and FIG. 2 is a cross-sectional view illustrating the detail of the novel control valve of the present application.

DESCRIPTION OF THE PREFERRED EMBODIMENT

Referring to FIG. 1, there is illustrated control valve means 10, which embody the principles of the present invention. The control valve means 10 includes a control valve 12 adapted to be mounted between flanges 14 and 16 in the pipeline members 18 and 20. Secured to the control valve is a suitable actuator indicated generally by the numeral 22. The actuator 22 may be of the direct-acting diaphragm type, reverse-acting diaphragm type, or a piston actuator as will be apparent to those skilled in the art. The specific detail of the actuator forms no part of the present invention, and, accordingly, the actuator will not be described in further detail.

As seen in FIG. 1, the control valve includes a flangeless body 24 adapted to be secured between the flanges 14 and 16 of the pipeline in abutting relationship thereto and retained in place between the flanges by suitable fastening means, for example, securing bolts and retention nuts 26 and 28, respectively. The bolts or studs 26 entirely surround the body 24 and centrally position the body with respect to flanges 14 and 16 so as to align the inlet and outlet in body 24 with the openings in flanges 14 and 16.

The actuator 22 includes a casing having a yoke portion 30 which is adapted to be secured to an upwardly projecting bonnet portion 32 of the valve body 24 by means of a bonnet nut 34.

Turning to FIG. 2, there is better shown the internal construction of the control valve 12. It is seen the valve body portion 24 and the bonnet portion 32 are integrally cast one with the other, so as to eliminate a gasketed joint between the two members as has been used in the past. The valve body includes an inlet 36 and an outlet 38, communicated to one another by a streamlined flow passage 37. The flow passage 37, which is produced by precision casting provides for greater capacity than could be obtained from prior valve body constructions made from machined bar stock. It is noted that the valve body 24 does not have flanges at either end. The flangeless valve body saves flange material and provides for economical installation. Eliminated from the valve body are objectionable screwed end connections.

The valve body includes an internal wall member 40, having an opening therethrough. A recessed shoulder 41 is provided in the wall 40 for receiving a seat ring gasket 42 and an annular seat ring member 43. The seat ring gasket 42 is made from a material compatible with corrosive fluid, for example, a glass filled tetrafluoroethylene. The opening 45 in the seat ring member defines a portion of the passage 37 within the valve body 24. The seat ring member 43 is maintained in place by means of a valve cage 44. The valve cage 44 is secured to the valve body 24 by detachable retaining means, which include a plate 48 detachably affixed to the valve body by means of studs 49 and nuts 50.

The valve cage 44 includes an end portion 46 and a tubular portion extending outwardly from the end portion and having a plurality of openings 51 defined therein. The valve cage 44 is provided with an intermediate annular flange-like portion 52. Disposed between the flange-like portion 52 of the valve cage 44 and a shoulder 54 of the valve body is a compressible gasket member 56.

An alignment pin 58 is disposed in aligned openings in the valve cage end portion 46 and the plate 48 to provide for positive orientation of the cage 44 within the valve body 24.

The flow of fluid through the passage 37 is regulated by the valve plug 62 which is movable toward and away from engagement with the seat ring 43. The valve stem 64 is secured at one end to the valve plug 62 and at the other end to the actuator 22.

Disposed concentrically about the valve stem 64 within the bonnet portion 32 of the valve body is a guide bushing 66. Below the guide bushing 66, there is provided a wiper ring 68. Above the guide bushing 66 in engagement with a washer member 69 is a second wiper ring 70. A suitable packing indicated generally by the numeral 72 is provided about the valve stem 64 within the bonnet portion 32 of the control valve 12. As indicated, the packing 72 includes ring members 73, a gland member 74 retained in placed above the packing rings 73 by means of a closure plate 75 secured to the bonnet portion 32 of the control valve by means of studs 76 and nuts 77, and a spring 78 disposed about the valve stem 64 for maintaining compression of the packing rings 73. The spring 78 bears at each end against washers 80 and 82. A wiper ring 79 may be provided between gland member 74 and closure plate 75 to prevent the entrance of damaging particles into the packing, thereby prolonging packing and bushing life.

The wiper ring 79 may be made from a suitable material, such as felt. Members 68 and 70 may be made from a suitable plastic material, for example, tetrafluoroethylene. The gaskets 42 and 56 may be made from a suitable resilient or compressible material that is compatible with corrosive fluids, for example, a material found satisfactory is a glass-filled tetrafluoroethylene.

There has been provided by the present invention a control valve having a bonnet integrally cast with the valve body so as to eliminate a gasketed joint. The flangeless valve body of the present invention eliminates objectionable screwed end connections, saves material and provides for economical installation. The valve cage, seat ring and valve plug may easily be removed from the valve body without any necessity for removing the valve body from the pipeline. It is noted that the seat ring is engaged with a shoulder on the lower surface of the internal wall, that is, a surface facing in a direction opposite from the actuator. Thus, in an installation where corrosion "freezes" the seat ring in the internal wall of the body, actuator power may be used to urge the valve stem 64 downwardly and thereby force the valve plug into engagement with the seat ring and thereby urge the seat ring from engagement with the wall 40 to facilitate removal of the seat ring 43. The surface of the flange 52 on the valve cage 46 cooperates with an adjacent surface 54 on the body 24 adjoining the gasket 56 to provide a metal-to-metal stop. This stop at the body gasket section provides correct compressive loading on the gaskets 56 and 42 and also corrects three-dimensional retention of the gaskets.

While I have shown a presently preferred form of the invention, it will be understood that the invention is not limited thereto, since it may be otherwise embodied within the scope of the following claims.

What is claimed is:
1. A control valve for handling corrosive fluids adapted to be mounted in a pipeline, said control valve comprising a cast flangeless valve body including an integrally formed bonnet portion, an inlet in said valve body, an outlet in said valve body, a service opening in said valve body, a flow passage communicating said inlet and said outlet, an internal wall in said valve body having an opening therein, an annular seat ring in said opening in said internal wall, a valve stem movable in said bonnet portion having a valve plug thereon for cooperating with said seat ring to control fluid flow through said flow passage, a valve cage insertable into the valve body through the service opening and engaging with the seat ring to retain the seat ring in place, a compressible seal between the valve cage and the valve body, a compressible seal between a shoulder in said internal wall in said valve body and the seat ring, and cooperating stop means on the valve cage and valve body for limiting the compressive loading on the compressible seals including an annular flange on said valve cage, which cooperates with a surface on the valve body to provide a stop for providing correct compressive loading on the compressible seals and correct three-dimensional retention of the compressible seals and removable means for detachably fixing the valve cage in position in the valve body including a cover plate engaging the valve cage, removal of the removable means permitting removal of the valve plug, valve cage and seat ring for repair or replacement without removal of the valve body from a pipeline, the valve plug being operable axially to urge the seat ring from the internal wall to facilitate removal of the seat ring and valve cage.

2. A control valve as in claim 1 wherein said pipeline includes a pair of spaced flanges, said valve body being disposed between said flanges in abutting relationship thereto, bolt means for drawing said flanges toward one another to retain said valve body, said bolt means comprising a plurality of bolts surrounding said valve body.

References Cited
UNITED STATES PATENTS

| | | | |
|---|---|---|---|
| 2,826,215 | 3/1958 | Wolfslau et al. | 137—454.6 |
| 2,845,085 | 7/1958 | Robbins | 137—454.6 |
| 3,123,091 | 3/1964 | Elsey | 251—367 XR |
| 3,153,421 | 10/1964 | Webster | 251—366 XR |
| 3,211,421 | 10/1965 | Johnson et al. | 251—367 XR |
| 3,244,398 | 4/1966 | Scaramucci | 251—367 XR |
| 3,387,632 | 6/1968 | Grove | 251—367 XR |
| 3,405,910 | 10/1968 | Scaramucci | 251—367 XR |

SAMUEL SCOTT, Primary Examiner

U.S. Cl. X.R.

251—363